United States Patent
Nadalin et al.

(10) Patent No.: US 7,735,117 B2
(45) Date of Patent: *Jun. 8, 2010

(54) CONTEXT-SENSITIVE CONFIDENTIALITY WITHIN FEDERATED ENVIRONMENTS

(75) Inventors: Anthony J. Nadalin, Austin, TX (US); Ajamu A. Wesley, Concord, MA (US)

(73) Assignee: International Business Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 12/172,229

(22) Filed: Jul. 12, 2008

(65) Prior Publication Data

US 2008/0263225 A1      Oct. 23, 2008

Related U.S. Application Data

(63) Continuation of application No. 10/814,090, filed on Mar. 31, 2004, now Pat. No. 7,467,399.

(51) Int. Cl.
*G06F 7/04* (2006.01)
*H04K 1/00* (2006.01)
*G06F 15/173* (2006.01)

(52) U.S. Cl. .......................... 726/2; 713/185; 709/225
(58) Field of Classification Search .................... 726/2; 713/185; 709/225
See application file for complete search history.

(56) References Cited

U.S. PATENT DOCUMENTS

| | | | | |
|---|---|---|---|---|
| 5,995,945 A | * | 11/1999 | Notani et al. | 705/28 |
| 7,130,885 B2 | * | 10/2006 | Chandra et al. | 709/206 |
| 7,134,137 B2 | * | 11/2006 | Joshi et al. | 726/1 |
| 7,137,006 B1 | * | 11/2006 | Grandcolas et al. | 713/180 |
| 7,143,190 B2 | * | 11/2006 | Christensen et al. | 709/246 |
| 7,143,439 B2 | * | 11/2006 | Cooper et al. | 726/11 |
| 7,269,664 B2 | * | 9/2007 | Hutsch et al. | 709/246 |
| 7,346,923 B2 | * | 3/2008 | Atkins et al. | 726/6 |
| 2002/0059425 A1 | * | 5/2002 | Belfiore et al. | 709/226 |
| 2002/0103811 A1 | * | 8/2002 | Fankhauser et al. | 707/104.1 |
| 2003/0046391 A1 | * | 3/2003 | Moreh et al. | 709/225 |
| 2003/0084302 A1 | * | 5/2003 | de Jong et al. | 713/185 |
| 2003/0163733 A1 | * | 8/2003 | Barriga-Caceres et al. | 713/201 |
| 2004/0003287 A1 | * | 1/2004 | Zissimopoulos et al. | 713/201 |
| 2004/0015723 A1 | * | 1/2004 | Pham et al. | 713/201 |
| 2004/0205473 A1 | * | 10/2004 | Fisher et al. | 715/500 |
| 2004/0230831 A1 | * | 11/2004 | Spelman et al. | 713/201 |
| 2005/0044197 A1 | * | 2/2005 | Lai | 709/223 |
| 2005/0114701 A1 | * | 5/2005 | Atkins et al. | 713/201 |
| 2005/0149496 A1 | * | 7/2005 | Mukherjee et al. | 707/3 |

* cited by examiner

*Primary Examiner*—Techane J Gergiso
(74) *Attorney, Agent, or Firm*—Marcia L. Doubet

(57) ABSTRACT

Techniques are disclosed for achieving context-sensitive confidentiality within a federated environment for which content is aggregated in a distributed Web portal (or similar aggregation framework), ensuring that message portions that should be confidential are confidential to all entities in the federated environment except those entities to which the message portions may properly be divulged. The federation may comprise an arbitrary number of autonomous security domains, and these security domains may have independent trust models and authentication services. Using the disclosed techniques, messages can be routed securely within a cross-domain federation (irrespective of routing paths), thereby ensuring that confidential information is not exposed to unintended third parties and that critical information is not tampered with while in transit between security domains. Preferred embodiments leverage Web services techniques and a number of industry standards.

14 Claims, 5 Drawing Sheets

```
<SOAP-ENV:Header>
505— <p:traversalPathRef xmlns:xlink="www.w3.org/1999/xlink"
        xmlns:p="www.ibm.com/p2p/schema/xlink/linkbase"
        xlink:type="simple" xlink:show="new"
510—   xlink:href='http://ibm.sampleRoute/linkbase/lb.xml"
     SOAP-ENV:mustUnderstand="1"/>
</SOAP-ENV:Header>
```

```
<SOAP-ENV:Header>
605— <msgType>contentRequest</msgType>
610— <securityHeader>
        <msgReceiver>
615—        <receiverID>1.2.3.4:999</receiverID>
            <receiverTagName>1234Tag</receiverTagName>
        </msgReceiver>
        <msgReceiver>
620—        <receiverRole>remote trust proxy</receiverRole>
            <receiverTagName>RTPTag</receiverTagName>
        </msgReceiver>
        ...
     </securityHeader>
625— <1234Tag>2m3k4k5kak7p0ty3</1234Tag>
630— <RTPTag>aXbYcZ...9q8j7k6w5p</RTPTag>
</SOAP-ENV:Header>
```

CONTEXT-SENSITIVE CONFIDENTIALITY WITHIN FEDERATED ENVIRONMENTS

RELATED INVENTION

The present invention is related to commonly-assigned U.S. Pat. No. 7,346,923 (Ser. No. 10/719,490, filed Nov. 21, 2003), which is titled "Federated Identity Management within a Distributed Portal Server". This commonly-assigned invention is referred to herein as "the related invention" and is hereby incorporated herein by reference.

BACKGROUND OF THE INVENTION

1. Field of the Invention

The present invention relates to computer software, and deals more particularly with techniques for achieving context-sensitive confidentiality within a federated environment for which content is aggregated in a distributed Web portal (or similar aggregation framework).

2. Description of the Related Art

Web portals (sometimes referred to equivalently as portal platforms, portal systems, or portal servers) are designed to serve as a gateway, or focal point, for access to an aggregation or collection of information and applications from many different sources. Portals often provide an end user view, commonly referred to as a "portal page". A portal page is often structured as a single overview-style page (which may provide links for the user to navigate to more detailed information). Alternatively, portal pages may be designed using a notebook paradigm whereby multiple pages are available to the user upon selecting a tab for that page. (Other frameworks which aggregate content and/or services may have characteristics analogous to those of a portal. The term "portal", as used herein, is intended to include such other aggregation frameworks.)

In addition to providing for content delivery to end users, Web portals are increasingly used as gateways to so-called "Web services" (i.e., network-accessible services) for distributed computing. Web services are a rapidly emerging technology for distributed application integration in a distributing computing environment such as the Internet. In general, a "Web service" is an interface that describes a collection of network-accessible operations. Web services fulfill a specific task or a set of tasks, and may work with one or more other Web services in an interoperable manner to carry out their part of a complex workflow or a business transaction. For example, completing a complex purchase order transaction may require automated interaction between an order placement service (i.e., order placement software) at the ordering business and an order fulfillment service at one or more of its business partners.

With Web services, distributed network access to software becomes widely available for program-to-program operation, without requiring intervention from humans. Web services are generally structured using a model in which an enterprise providing network-accessible services publishes the services to a network-accessible registry, and other enterprises needing services (or human beings searching for network-accessible services) are able to query the registry to learn of the services' availability. (Hereinafter, references to an entity or user making use of Web services are intended to include programmatic entities as well as human beings.) The participants in this computing model are commonly referred to as (1) service providers, (2) service requesters, and (3) service brokers. These participants, and the fundamental operations involved with exchanging messages between them, are illustrated in FIG. 1. The service providers 100 are the entities having services available, and the registry to which these services are published 110 is maintained by a service broker 120. The service requesters 150 are the entities needing services and querying 140 the service broker's registry. When a desired service is found using the registry, the service requester binds 130 to the located service provider in order to use the service. These operations are designed to occur programmatically, without requiring human intervention, such that a service requester can search for a particular service and make use of that service dynamically, at run-time. The Web services model is theoretically available for any type of computing application.

Web services allow applications and services (referred to hereinafter as services for ease of reference) to interact with one another using Web-based standards. A number of standards are being promulgated in the Web services arena as the problems inherent in that environment become better understood. A complete discussion of these protocols is beyond the scope of the present discussion, but basic protocols on which Web services work is being built include HTTP ("Hypertext Transfer Protocol"), SOAP ("Simple Object Access Protocol"), and WSDL ("Web Services Description Language"). HTTP is commonly used to exchange messages over TCP/IP ("Transmission Control Protocol/Internet Protocol") networks such as the Internet. SOAP is an XML ("Extensible Markup Language") based protocol used to send messages for invoking methods in a distributed environment. WSDL is an XML format for describing distributed network services.

For more information on SOAP, refer to "Simple Object Access Protocol (SOAP) 1.1, W3C Note 08 May 2000", which is available from the World Wide Web Consortium, or "W3C". The WSDL specification is titled "Web Services Description Language (WSDL) 1.1, W3C Note 15 Mar. 2001", and is also available from the W3C. HTTP is described in Request For Comments ("RFC") 2616 from the Internet Engineering Task Force, titled "Hypertext Transfer Protocol—HTTP/1.1" (June 1999). It should be noted that references herein to "HTTP" are intended in a generic sense to refer to HTTP-like functions. Some Web services operations, for example, require HTTPS instead of HTTP, where HTTPS is a security-enhanced version of HTTP.

The goal of Web services is to provide service requesters with transparent access to program components which may reside in one or more remote locations, even though those components might run on different operating systems and/or be written in different programming languages than those of the requester.

A federation within a Web services context relates to collaboration among loosely-coupled and complementary Web services across security domains. For example, suppose employees from two companies would like to meet with one another, and that the two companies have different automated calendar/meeting services, each of which provides complementary functionality (e.g., by managing employee's schedules). Federating these complementary services would allow the independent calendar services to exchange application information, enabling the employees to establish the joint meeting using their respective calendar services.

While support for Web services and portals in federated environments continues to make great progress, areas remain where improvements can be made.

SUMMARY OF THE INVENTION

An object of the present invention is to provide context-sensitive confidentiality within a federated environment.

Another object of the present invention is to provide context-sensitive confidentiality in an environment that leverages a distributed Web portal for aggregating a plurality of views or services.

A further object of the present invention is to define techniques for securely transmitting messages within a federation that spans multiple trust models, where one or more intermediaries along a particular message path may need access to security-sensitive portions of a transmitted message.

Yet another object of the present invention is to provide techniques whereby security-sensitive information transmitted with a message can be selectively disclosed to entities that are authorized to access that information.

Still another object of the present invention is to define techniques whereby a message can carry security-sensitive information for multiple intended receivers, such that each intended receiver can access only the security-sensitive information specifically intended for that receiver.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods, systems, and/or computer program products. In one aspect, techniques are providing for achieving context-sensitive confidentiality among security domains within a federated environment, further comprising: determining a route to be taken by a message to be transmitted in the federated environment, where the route spans a plurality of the security domains; determining rights of nodes to be encountered on the determined route to access security-sensitive portions of the message; selectively protecting the security-sensitive portions of the message, according to the determined access rights; and transmitting the message with its selectively-protected portions on the determined route.

The selective protection preferably further comprises encrypting at least one security-sensitive portion of the message and/or computing a digital signature over at least one security-sensitive portion of the message.

Policy may be consulted when determining the route to be taken for the message. Policy may also, or alternatively, be consulted when determining the access rights for the nodes to be encountered.

A role of at least one of the nodes to be encountered may be determined, and determining the access rights may then further comprise consulting policy for each determined role, wherein the policy specifies access rights for that role.

The selective protection is preferably provided by encrypting each security-sensitive portion of the message for each node and/or role determined to have access rights to that portion. Public keys associated with each of the nodes/roles are preferably used for the encrypting.

Optionally, the determined route may be specified in the transmitted message.

Using these techniques, upon receiving the transmitted message at a selected one of the nodes on the determined route, the node can securely access only those ones of the selectively-protected portions of the received message to which the selected node has access rights.

The transmitted message may further contain information identifying an authentication authority from a first of the security domains and indicate that this authentication authority has already authenticated a party for which the message requests access to services, such that nodes receiving the message in other ones of the security domains can bypass authentication of the party for access to services of that other security domain, upon verifying authenticity of the authentication authority and establishing that the authentication authority vouches for the received message. Preferably, the authentication authority is determined to vouch for the received message if a digital signature computed by the authentication authority and transmitted with the message is determined, by the node receiving the message in the one of the other security domains, to be valid. The transmitted message may contain security credentials of the party, where those security credentials have been authenticated by the identified authentication authority and are protected such that only authorized ones of the nodes receiving the message in other ones of the security domains can access the protected security credentials. Preferably, the protected security credentials are encrypted using a public key of each of the authorized ones of the nodes receiving the message, such that each of the authorized ones can decrypt the protected security credentials using a corresponding private key.

The present invention may also or alternatively be deployed as one or more services for ensuring context-sensitive confidentiality of messages transmitted within a federated environment. As one example, a message confidentiality service may be provided for securely transmitting messages among security domains within a federated environment, and this service may comprise: determining a route to be taken by a message to be transmitted in the federated environment, where the route spans a plurality of the security domains; determining rights of nodes to be encountered on the determined route to access security-sensitive portions of the message; and determining how the security-sensitive portions of the message should be protected, according to the determined access rights. A fee may be charged for performing the service. Optionally, the service may further comprise applying the determined protections to the security-sensitive portions.

The present invention will now be described with reference to the following drawings, in which like reference numbers denote the same element throughout.

BRIEF DESCRIPTION OF THE DRAWINGS

FIG. 5 illustrates a sample message header that may be included in a transmitted message to convey message routing information; and FIG. 6 shows sample message contents of the type that may be transmitted by an embodiment of the present invention, illustrating encryption of security-sensitive information for intended receivers to be encountered along the message path to the ultimate message receiver.

Figure 1:
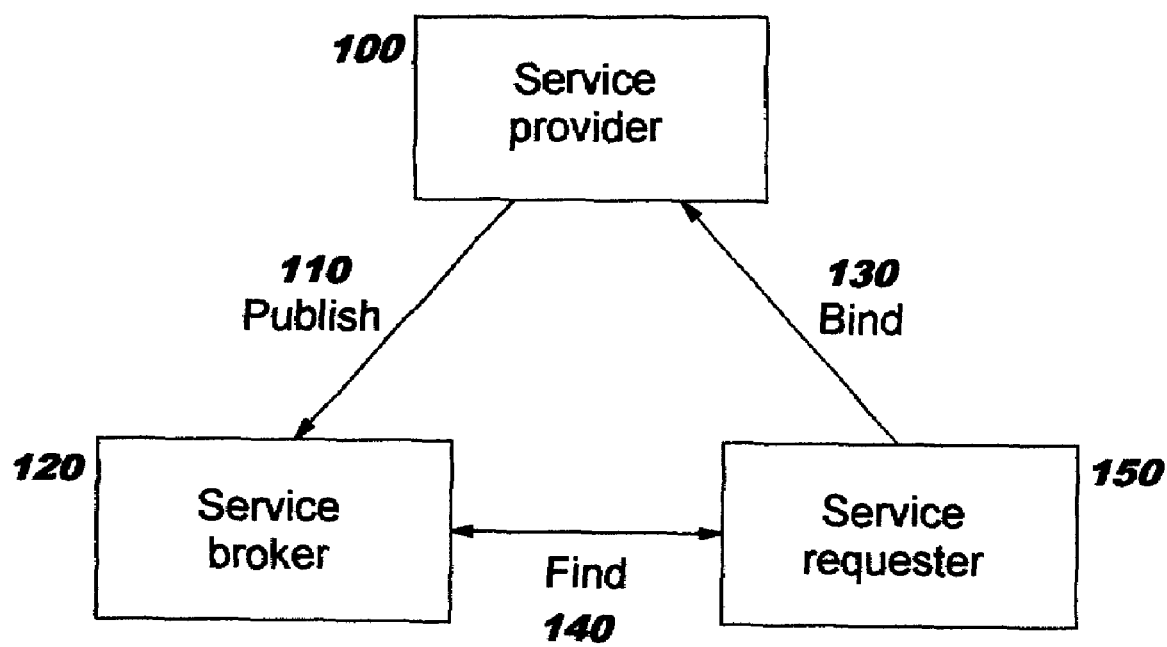
FIG. 1 provides a diagram illustrating participants and operations of a service-oriented architecture in which Web services are deployed, according to the prior art.

DESCRIPTION OF PREFERRED
EMBODIMENTS

The present invention discloses techniques for achieving context-sensitive confidentiality within a federated environment. As used herein, the term "context-sensitive confidentiality" comprises ensuring that message portions that should be confidential are confidential to all entities in the federated environment except those entities to which the message portions may properly be divulged. The federation may comprise an arbitrary number of autonomous security domains, and these security domains may have independent trust models and authentication services. Using the disclosed techniques, messages can be routed securely within a cross-domain environment, thereby ensuring that confidential information is not exposed to unintended third parties and that critical information is not tampered with while in transit between security domains. Preferred embodiments leverage Web services techniques and a number of industry standards.

The related invention disclosed techniques for managing identities across autonomous security domains which may be comprised of independent trust models, authentication services, and user enrollment services (and, optionally, authorization services). Using techniques disclosed therein, a set of credentials is obtained for a user (whether a human user or a programmatic entity) accessing an aggregation point-of-contact (such as a portal interface provided by a distributed portal platform). Those credentials are then authenticated for use in the local security domain. By consulting policy information, other security domains for which the user must be authenticated are determined. (Policy information may be created, for example, by a systems administrator for the local security domain.)

As an example, suppose the user will access an aggregated view comprising views of three services, each of which requires authentication. A first service might provide a view of this user's employee benefits, while a second provides a view of the user's bank account information and a third provides a view of the user's stock portfolio. Further suppose that each service is deployed in a distinct security domain, and that the employee benefits service is provided by the local security domain (as may be the case when the user accesses the aggregated view while at work). In this example, policy information preferably identifies trust components that are responsible for coordinating authentication in each of the security domains. These trust components are referred to in the related invention as "trust proxies". (In preferred embodiments of the related invention and the present invention, a trust proxy is preferably deployed as a Web service that manages trust relationships and routes authentication-related messages between federation participants.)

Thus, according to the related invention, once the local trust proxy determines that the user is authenticated for the local security domain, this local trust proxy passes information pertaining to the user's authenticated credentials to the trust proxy for each of the remote security domains. Credential mapping operations are then carried out in the remote security domains to determine the user's local credentials for each of the remote security domains. For example, the user might have a user identifier ("user ID") of "Employee1234" in the local domain; a user ID of "Account5678" in the banking domain; and a user ID of "Portfolio543" in the stock portfolio domain, where all of these identifiers belong to the same user. Different underlying security techniques may be used in the different security domains as well. Credential mapping eliminates the need for the user to provide each of these different user IDs (and their corresponding password) to the aggregation point, and allows each security domain to carry out its own security techniques to authenticate the user with the user credentials which have been established for that security domain.

Authentication results within each domain are passed to the appropriate service deployed within that domain (e.g., informing the bank account service as to whether the bank account information for the user should be invoked, in the example, where this bank account service operates to provide a view that will be aggregated at the aggregation point-of-contact with the employee benefits information and stock portfolio information). These results are also sent to the aggregation point-of-contact. If the aggregation point-of-contact receives information that the user is not authenticated (or not authorized) for using services in any of the security domains, then the view of the corresponding service will not be included in the aggregated view (and the corresponding service, which also receives this information, should not supply content to the aggregator). In preferred embodiments of the related invention, the aggregation point-of-contact provides the aggregated views as a portal page and the remote services are Web services-based portlets; the local service is preferably deployed as a portlet as well. The related invention therefore enables seamlessly integrating Web services-based portlets, which may rely on different security mechanisms and which may be deployed by various third parties, within a common portal page or other aggregation.

Several of the industry standards which are leveraged by preferred embodiments of the related and present inventions will now be described.

A specification titled "Web Services Security (WS-Security), Version 1.0" and published Apr. 5, 2002 (also referred to herein as "WS-Security" or "the Web services security specification"), drafted jointly by International Business Machines Corporation ("IBM"), Microsoft Corporation, and Verisign, defines techniques that may be used for Web services-based message security. A specification titled "Web Services Federation Language (WS-Federation)" and published Jul. 8, 2003 (also referred to herein as "WS-Federation" or "the Web services federation specification"), drafted jointly by IBM, Microsoft Corporation, and Verisign, describes a model for integrating incompatible security mechanisms or security mechanisms that are deployed within different domains. For example, suppose two business partners each implement public key encryption-based identity infrastructures, or that one of the partners happens to implement a Kerberos system while the other trading partners do not. WS-Federation offers a roadmap for how to apply Web service technologies to tie those systems together, leveraging lower-level Web services security specifications that provide support for message security, policy, trust, and privacy.

Preferred embodiments of the related and present inventions also leverage the specification titled "Web Services for Remote Portals Specification, Version 1.0" (referred to hereinafter as "WSRP"), which was approved as an OASIS ("Organization for the Advancement of Structured Information Standards") standard in August, 2003 for operating within a distributed portal environment.

According to preferred embodiments of the related and present inventions, each trust proxy is configured with routing information and policy declarations to ensure that messages are only sent to trusted parties (as determined by relationships which are preferably established out-of-band between the various domains). Alternatively, routing information may be propagated within the context of a SOAP message via a stateless protocol such as the Web Services Routing protocol, defined in "Web Services Routing Protocol (WS-Routing)", published Oct. 23, 2001 by Microsoft Corporation. This protocol specification is referred to herein as "WS-Routing".

These above-described specifications, which do not disclose the inventive techniques of the related or present inventions, are hereby incorporated herein by reference.

Federated identity management according to the related invention allows services residing in disparate security domains to interoperate and collaborate securely, irrespective of the differences in the underlying security mechanisms and/or operating system platforms. In effect, the security mechanisms are programmatically tied together, or bridged, in a transparent manner in order to enable this interoperation and secure collaboration among services. Federated identity management is one of the key requirements for higher-level federation scenarios.

As an example of how other scenarios build upon federated identity management, consider trading partners where each partner manages an autonomous and insular supply chain. Federating the vendor supply chains would provide a greater degree of optimization across inventory, production, distribution, and transportation systems among the trading partners. This level of federation implies collaboration among enterprise resource planning ("ERP") systems and supply chain management decision support services hosted by the trading partners. For example, Acme Widgets company may buy inventory from Supplier A, which in turn buys inventory from Supplier B. There may be a number of scenarios where Supplier B could operate more efficiently with access to selected information of downstream companies such as Acme Widgets. However, each company's information technology systems typically provide security mechanisms that restrict access to core business processes to entities that are authenticated and determined to be authorized for this access. Without a flexible and interoperable means of federated identity management, the efficiencies associated with highly-optimized, collaborative supply chains are untenable. Using federated identity management, as disclosed in the related invention, the necessary authorizations can be granted and subsequently verified at run time, and communicating entities can be authenticated (including authentication across security domains) to ensure that the appropriate trading partners (and only those trading partners) can access one another's supply chains in a seamless manner. (Many other federation scenarios can be imagined that require federated identity management and that will therefore benefit from techniques of the related and present inventions.)

The present invention may be used in combination with an embodiment of the related invention to securely transmit identity management information used when federating services within an aggregation point. Alternatively, an embodiment of the present invention may be used in other environments where it is necessary to provide context-sensitive confidential message transmissions in a federated environment. Accordingly, references herein to the related invention are by way of illustration but not of limitation.

Figure 2:
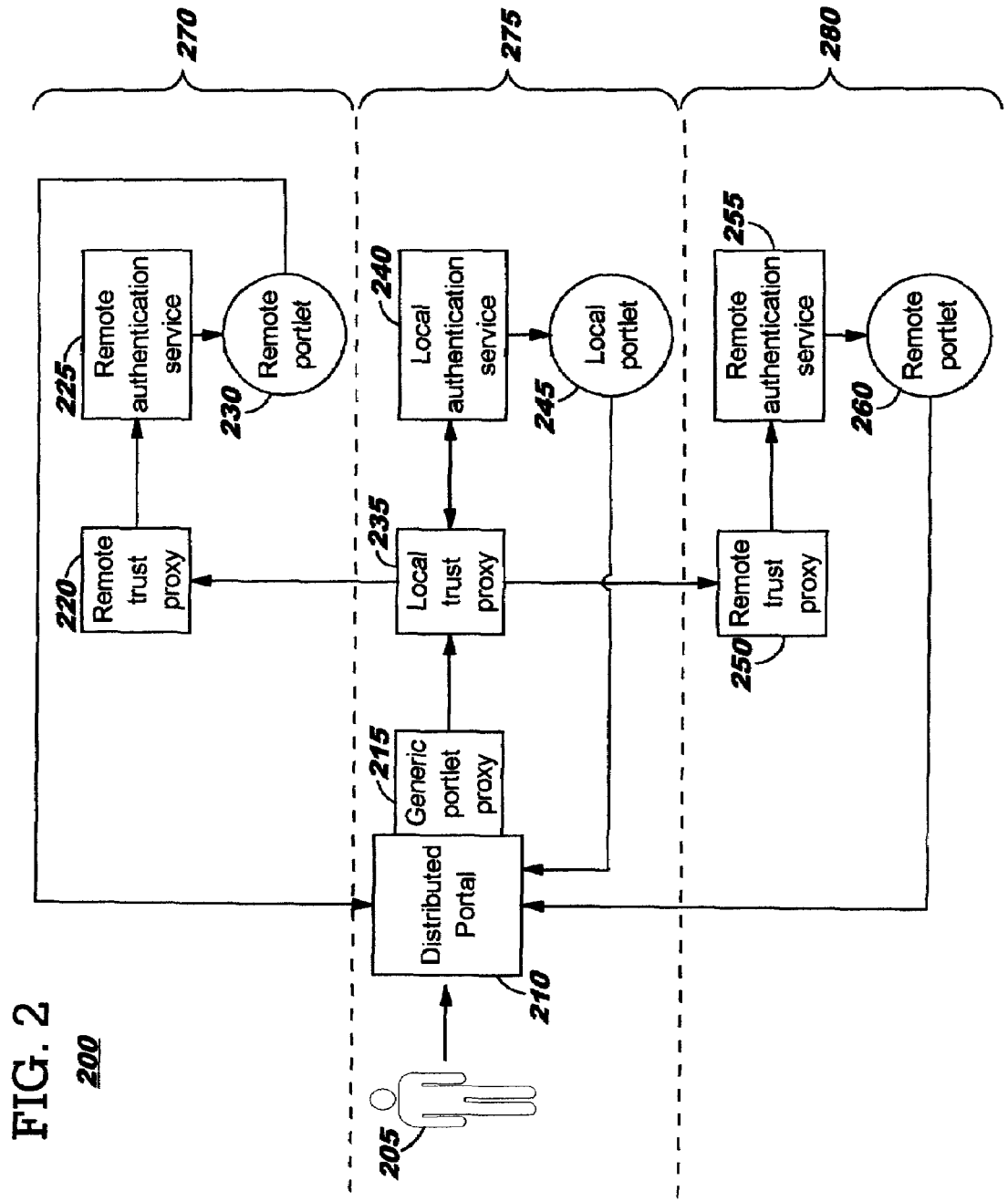
FIG. 2 illustrates components of that may be involved when a confidential message is transmitted among participants in a federated environment.

FIG. 2 provides a sample federated environment and is used to show how messages may need to be exchanged among components when aggregating services in a federated environment. In this sample environment 200, a user 205 interacts with a distributed portal 210 that acts as the federation entry point (also referred to herein as an aggregation point-of-contact) for end users. In this example, the distributed portal aggregates, within a common portal interface, content from services provided by remote portlets 230, 260 and local portlet 245, where these services span multiple independent security domains (shown in the figure as local security domain 275 and remote security domains 270, 280). As disclosed in the related invention, a generic portlet proxy 215 is responsible for protocol conversion of messages which are published by distributed portal 210 to local trust proxy 235. The generic portlet proxy 215 may, for example, convert HTTP requests used by portal 210 to WSRP-compliant SOAP messages that can be consumed at local trust proxy 235 (and vice versa). (The term "generic portlet proxy", as used in the related invention and as used herein, refers to a portlet that acts as an intermediary between an application or software resource requesting a particular service and a software resource providing that service.)

Thus, when distributed portal 210 publishes a message requesting authentication of user 205 in the local security domain 275, local trust proxy 235 communicates with local authentication service 240, which performs the authentication. Assuming the user is authenticated locally, results of the authentication are passed by local trust proxy 235 to remote trust proxies 220 and 250, which in turn communicate with their own local authentication services (identified in FIG. 2 as remote authentication services 225 and 255, respectively) to determine whether the user is authenticated in the remote domains. (As disclosed in the related invention, the user for which services are to be federated may have varying security identities within the different security domains 270, 275, 280. Thus, credential mapping may be carried out in the remote domains when authenticating the user for that domain.)

Each of the authentication services 225, 240, 255 is shown in FIG. 2 as communicating authentication results to a corresponding portlet 230, 245, 260, where a service will be performed for this user (assuming the user is authenticated and authorized for that service). In addition, each authentication service preferably communicates authentication results to its local trust proxy, which in turn informs the distributed portal 210 as to whether the user is authorized to view content from the respective portlet. (These latter communications have not been illustrated in FIG. 2.) With reference to the example discussed above where a user wishes to view a page aggregating views of three services, local portlet 245 represents the employee benefits service, and remote portlets 230 and 260 represent the bank account service and stock portfolio service.

The related invention used the term "relying" service to refer to WSRP remote portlet Web services that consume authentication information from a local or remote domain in order to provide a service to an already-authenticated user (or programmatic entity). According to the present invention, caching may be used to optimize authentication operations, whereby previously-determined authentications within a particular context can be cached for some period of time, and newly-arriving requests pertaining to cached authentications can then leverage the cached information rather than performing the authentication again. In addition, preferred embodiments may cache routing information. Caching is discussed in more detail with reference to FIG. 4.

The sample configuration in FIG. 2 is provided for purposes of illustration and not of limitation. It may happen, for example, that more than more or fewer separate security domains exist in the configuration of an actual distributed portal scenario. (And, in some cases, a distributed portal scenario may include one or more remote portlets that do not require authentication, in combination with one or more remote portlets that do require authentication.)

Note also that while discussions of the present invention are in terms of a distributed computing environment that leverages a portal platform for aggregation, the inventive concepts are applicable to other types of content frameworks or aggregators which provide analogous functionality, and thus references to portals and their portlet paradigm is by way of illustration and not of limitation.

As stated earlier, the related invention noted that end-to-end security in a cross-domain environment of the type illustrated in FIG. 2 is preferably provided to ensure that confidential information is not exposed to unintended third parties and that critical information is not tampered with while in transit between the security domains. However, techniques for providing context-sensitive confidentiality in a federated environment were not disclosed therein. Those techniques are the subject of the present invention.

The manner in which preferred embodiments of the present invention enable context-sensitive, confidential exchange of information among autonomous security domains will now be described in more detail.

Figure 3:
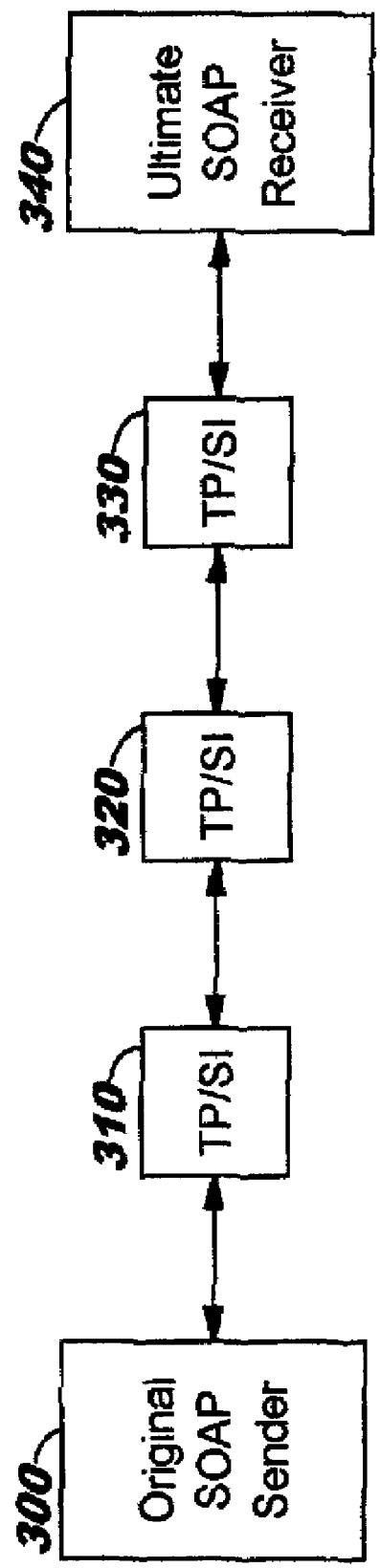
FIG. 3 shows a generalized routing path between a message sender and an ultimate message receiver, as well as several intermediaries along the path that may need access to at least some security-sensitive portion of the message, and is used to describe operation of preferred embodiments.

FIG. 3 shows participants on a generalized routing path used to transmit a SOAP message between a message sender 300 and an ultimate message receiver 340, as well as several intermediaries 310, 320, 330 that may be encountered along the path to message receiver 340. Intermediaries 310, 320, 330 are referred to in FIG. 3 using the notation "TP/SI", an abbreviation for "trust proxy/SOAP intermediary", indicating that these components may serve as trust proxies of the type discussed above and/or as SOAP nodes that route a message along the path from sender 300 to receiver 340. For example, TP/SI 310 might represent the local trust proxy 235 of FIG. 2, while TP/SI 320 represents remote proxy 220 and TP/SI 330 represents remote authentication service 225; and in this example, message sender 300 corresponds to generic portlet proxy 215 (operating on behalf of distributed portal 210) and message receiver 340 corresponds to remote portlet 230. (Note that when nodes 300-340 are identified in FIG. 3 as SOAP nodes, this implies that a service description is available for each node. In alternative embodiments, nodes other than SOAP nodes may be supported.)

To ensure that messages sent among the security domains are protected, security-sensitive portions of the messages are preferably encrypted before transmission. A particular intermediary may need access to one or more of these security-sensitive portions of a transmitted message for performing functions locally. For example, when an authentication request is transmitted from generic portlet proxy 215 to local trust proxy 235, the local trust proxy needs to determine what is being requested of the local environment and also which, if any, remote trust proxies it must contact to perform remote authentication. If information needed by local trust proxy 235 in the message sent from generic portlet proxy 215 is encrypted, then local trust proxy 235 must be able to decrypt that information. Local trust proxy 235 can then evaluate that decrypted information and, upon determining that remote trust proxies 220 and 250 must be contacted, sends messages to those trust proxies wherein encryption is used to protect security-sensitive information as it travels to the remote security domains. (Similarly, trust proxies in the remote domains may need to forward information to other receivers. Preferably, each trust proxy authenticates a digital signature on received messages to ensure the messages are authentic prior to carrying out further operations, as in the prior art.)

Figure 4:
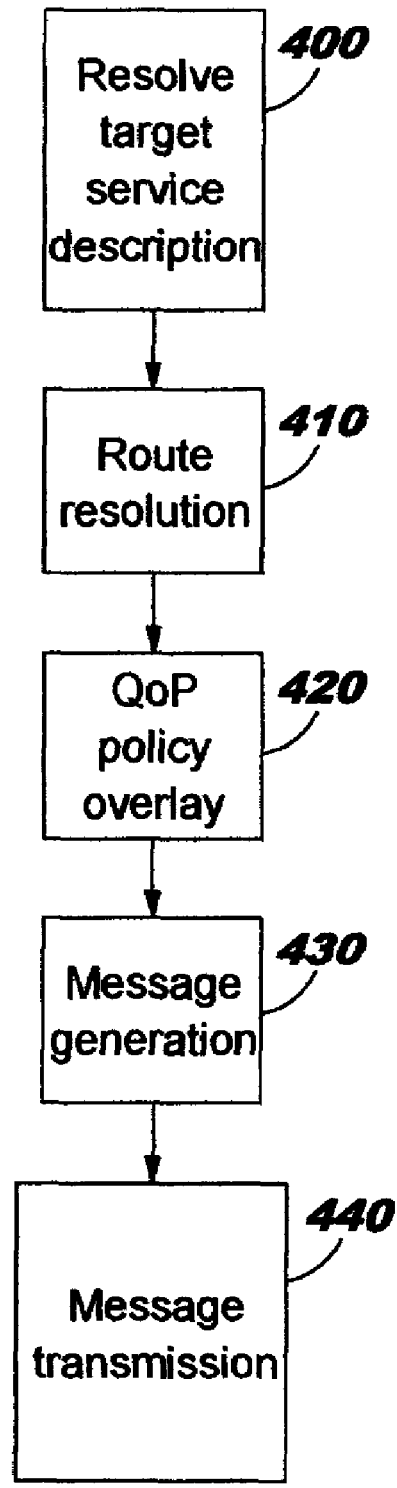
FIG. 4 provides a flowchart depicting logic that may be used to implement an embodiment of the present invention.

FIG. 4 illustrates logic that may be used in preferred embodiments for providing context-sensitive confidentiality for message portions that are transmitted among federation participants, and FIGS. 5 and 6 show sample syntax that may be used for message transmission.

The processing of FIG. 4 serves to establish fine-grained protection for transmitted messages. Beginning at Block 400, when a message sender has a message to be transmitted, preferred embodiments dynamically resolve the target service description of the ultimate message receiver (which is preferably specified as a WSDL specification), thereby determining the messages accepted by the receiver (and other information such as the applicable message bindings). In addition, policy information is preferably consulted to determine which portions of the message require security protection in this context. (Preferably, policy information used by preferred embodiments is specified according to the WS-Security specification). In this manner, a coarse-grained view of security requirements is initially established in terms of the ultimate message receiver.

The security requirements may comprise confidentiality, integrity, and/or authentication requirements (and authorization requirements may also be specified). The term "quality of protection", or "QoP", is used herein to refer generally to the security requirements that may be specified in policy information.

As an example of confidentiality requirements, the policy may specify whether portions of the message must be encrypted in this context (where the context preferably comprises at least an identification of the message sender and receiver as well as the message type), and if so, what portions must be encrypted; additional confidentiality requirements may also be specified in the policy information, such as required encryption strength or an encryption algorithm that must be used in this context.

As an example of message integrity requirements, the policy may specify whether a digital signature must be computed, and if so, what message portions should be included in a digest to be signed and how that digest should be computed.

Authentication requirements and/or authorization requirements may also be specified in the policy. In preferred embodiments, the trust proxies are responsible for ensuring that only authorized and valid message exchanges from authenticated entities are allowed within their respective security domain, thereby providing cross-federation authentication and authorization. For example, policy is preferably consulted to determine whether the message sender is authorized to send this message to this receiver.

Preferred embodiments leverage the generic portlet proxy shown at reference number 215 to coordinate context-sensitive confidentiality operations on behalf of the distributed portal. Accordingly, operations shown in FIG. 4 are preferably initiated by the generic portlet proxy when the distributed portal has a message to be transmitted. As an alternative approach, local trust proxy 235 may be responsible for coordinating the confidentiality operations upon receiving a message from the generic portlet proxy.

In Block 410, a determination is made as to what route this message should take to its ultimate receiver. The manner in which the route is determined may vary, and does not form part of the inventive concepts disclosed herein. As one approach, the route may be determined by consulting policy information—which may contain tuples specifying a message sender, message type, ultimate receiver, and corresponding path, for example. Routing optimizations may be applied, if desired for a particular environment. In preferred embodiments, the generic portlet proxy requests a route resolution from the local trust proxy. The local trust proxy may, in turn, consult another entity that is responsible for route selection. Or, the local trust proxy may consult one or more of the TP/SI components to determine a route to the ultimate message receiver. As yet another approach, a WS-Routing declarative routing statement may be consulted to determine the route to be taken.

According to preferred embodiments, the XML Linking ("XLink") language is used as a means of representing message traversal path definitions. Once a route to be taken by a message has been determined, the traversal path definition is preferably recorded at a Uniform Resource Locator ("URL"). By including that URL in a transmitted message, each receiver of the message can therefore consult the route definition to determine any next hop(s) for the message. The XLinking language is defined in "XML Linking Language (XLink) Version 1.0, W3C Recommendation 27 Jun. 2001", which is available from the W3C. XLink syntax is well known in the art, and a discussion thereof is not deemed necessary to an understanding of the present invention. (A sample message header using XLink notation to reference a stored route is described below with reference to FIG. 5.)

Once a route has been determined, it may optionally be cached or otherwise persisted (e.g., using a URL as discussed above) for subsequent use. For example, a particular message sender may need to send a series of messages to a message receiver, and if a previously-determined route is available, then the route determination can be bypassed. (Preferably, route caching considers the message type as well as the message sender and receiver; additional and/or different factors may be deemed pertinent in a particular environment.)

Preferred embodiments may also cache, at one or more nodes along a path, information comprising (1) whether the user is already authenticated to the local service; (2) whether the user's authorization for this service has already been determined (e.g., by comparing the user's credentials to stored policy information); and (3) which are the "next hops" in this path (i.e., the neighboring nodes to which the message should be routed). Subsequently, if a message is received for an already-authenticated user whose authorization is already determined, the authentication and authorization-checking for that user can be bypassed.

As shown in Block 420, after determining the message route, a quality of protection overlay is then performed. In preferred embodiments, this comprises harvesting policy information for all intermediaries that will be encountered along the selected route to the ultimate message receiver. Preferably, a WSDL specification for each of the intermediaries is consulted, and policy information of the intermediary is thereby identified. Or, roles of each intermediary may be used when locating appropriate policy information. For example, policy may specify that an intermediary in the role of routing entity is allowed only to view information pertaining to the selected route for the message or perhaps a subset of the route (such as an identification of the next hop), while intermediaries in the role of trust proxy are allowed to view additional information. As another example, policy may specify that a trusted entity that caches content should be allowed to decrypt selected portions of encrypted content within a transmitted message; or, if authentications are to be cached, as discussed earlier, then an encrypted message portion preferably contains the authentication information to be decrypted by the trusted entity that performs this authentication caching. This policy information as to which message portions should be accessible may be referred to as "entitlements" of message recipients.

The policy information obtained at Block 420, along with the policy information obtained at Block 400, is then analyzed to resolve any conflicts that may exist. (Conflict resolution, in this case, preferably includes using the most-restrictive or most-secure choice when multiple choices are present.) In this manner, the generic portlet proxy can determine the type(s) of fine-grained protection that are required for secure, context-sensitive message transmission (i.e., providing the proper encryption, digital signatures, and so forth, as specified by the policy overlay, for transmitting this particular message on this particular route).

When a route between the message sender and receiver is available from cache, as discussed above, then the intermediary-specific policy information (and corresponding conflict resolutions, if any) may also be cached, thereby yielding further efficiencies in message transmission without jeopardizing message confidentiality.

Once the appropriate security requirements for the message have been determined, a message reflecting those requirements is generated (Block 430). Preferred embodiments enable a particular security-sensitive message portion to be encrypted for subsequent decryption by multiple receivers. For example, each trust proxy 220, 235, 250 may need to know an identifier of a portal page for which authentication is being requested as well as the user ID and password provided by the user for accessing that portal page.

As stated earlier, even though the user's credentials may be different in remote security domains 270, 280, transmitting the credentials provided for accessing local security domain 275 to those other domains enables seamlessly retrieving the user's credentials for the remote domains via credential mapping. Therefore, it is necessary to protect the already-authenticated credentials that are in transit to the remote security domains. A security token, as described in the WS-Security specification, may be used to specify information for secure message exchanges among trusted parties, and in particular, to specify the credentials to be transmitted among trusted parties. In a simple format, a security token according to this WS-Security specification uses a "UsernameToken" element to encapsulate a user name and optional password. Depending on security policy, it may be desirable to encrypt the contents of this UsernameToken element. (Refer to the related information for a more detailed discussion of security tokens and examples of their use. Encryption of the contents of this element, however, was not discussed in the related invention.)

Alternatively, there may be one or more security-sensitive message portions to which only a single intermediary should be allowed access, and preferred embodiments also support this approach. Suppose, for example, that generic portlet proxy 215 is adapted to specify one message portion containing routing information that is deemed to be security-sensitive (and that routing intermediaries that do not serve as trust proxies will need to decrypt this message portion), another message portion containing security-sensitive information that is only to be decrypted by the local trust proxy, and yet another message portion that is to be decrypted by the local and remote proxies. Embodiments of the present invention preferably enable each of these message portions to be encrypted for its intended receivers (even though some redundancy may result).

If the policy indicates that a selected message portion is to be encrypted in a manner that enables each trust proxy to decrypt that message portion, for example, then the message portion is preferably encrypted once for each intended trust proxy, preferably using a public key of each intended trust proxy to separately encrypt the message portion. (Public keys of entities may be readily obtained using prior art techniques.) Or, if the policy indicates that a only particular one of the trust proxies (or perhaps one of the portlets) should have access to a message portion, then that message portion is encrypted only once (preferably using a public key of the intended receiver).

One or more message digests and digital signatures may also be computed at Block 430, as required to carry out the fine-grained protection of the message according to security requirements specified by the policy overlay, and the digital signature(s) are then preferably added to the message.

Note that the encrypted message portions and any digital signature(s) included with the message must conform to the applicable schema for the message (i.e., a valid message syntax must result). Preferred embodiments use XML Schema Definition ("XSD") annotations to reference the applicable schema within the SOAP message to be transmitted. Refer to FIG. 6, which is discussed below, for an example of syntax that may be used to protect selected message portions.

In Block 440, the context-sensitive confidential message is transmitted from the sender according to the determined route. Upon receipt at each intermediary, the intermediary locates the message portions to which it can obtain access, and when public key cryptography was used to encrypt those portions, the receiving intermediary uses its private key for decryption.

FIG. 5 shows a sample SOAP header 500 that may be used for specifying a reference to a path stored as an XLink, where a header of this type may be appended to outbound SOAP messages to convey the path to be taken by the message. This header 500 contains a <traversalPathRef> tag 505 (which, in the example of FIG. 5, is prepended with a name space identifier of "p" for "path"), and this <traversalPathRef> tag provides a reference 510 to a hypothetical linkset which stores more detailed information about the path (including identifiers of the nodes or intermediaries on the path). In the example of FIG. 5, the value of the "href" attribute 510 indicates that the traversal path information is stored in a linkbase document accessible using the URL "http://ibm.SampleRoute/linkbase/lb.xml". This URL provides a commonly-accessible means for nodes receiving a message to reference the determined route, and the node can use that information to determine where it should forward the message.

FIG. 6 provides an example of syntax that may be used to protect selected message portions, wherein a message includes security-sensitive information that has been encrypted for intended receivers that will be encountered along the message path to the ultimate message receiver. Preferably, a tag syntax is used for the messages. A sample syntax for a message header 600 is shown in FIG. 6, and is for purposes of illustration only.

A message type is preferably specified in the transmitted message, and message recipients (including intermediaries) preferably inspect this message type to determine whether the message should contain protected security-sensitive portions to be decrypted by that recipient. See reference number 605, which indicates that this sample message header is for a "contentRequest" message. The message may, for example, request content from the employee benefits service, bank account service, and stock portfolio service in the federation scenario discussed earlier. (In this example, the message preferably contains distinct protected content for each receiving service, such that only the bank account service has access to the user's bank account number and so forth, although this level of detail has not been illustrated in the sample message header in FIG. 6.)

The message preferably contains an element that an arbitrary message recipient (including intermediaries) can consult to determine where to find message portions that are to be decrypted by the message recipient. Obviously, this particular element should be specified in the clear. In FIG. 6, a "<securityHeader>" element 610 is provided for this purpose, and contains a set of "<msgReceiver>" elements 615, 620 . . . which each specify information about a particular intended receiver or a set of receivers described by a particular role. In the example, a particular message receiver is identified in element 615 by its IP address and port number (i.e., "1.2.3.4: 999"), and a set of receivers is identified in element 620 by their role "remote trust proxy" (for purposes of illustration). A "<receiverID>" and "<receiverRole>" tag, respectively, are used for these different types of information. Each "<msgReceiver>" element also contains a "<receiverTagName>" element that identifies the name of the tag where this intended receiver's security-protected information may be found. Thus, the receiver identified by IP address and port number in element 615 can find its protected information in the tag named "<1234Tag>", which is shown at reference number 625. Similarly, the receiver(s) identified by role in element 620 can find protected information in the tag named "<RTPTag>" (where "RTP" is used as an abbreviation for "remote trust proxy"), and this tag is shown at reference number 630. In tags 625 and 630, the contained information may be encrypted; it may contain digital signature information; and so forth. (As will be obvious once the teachings disclosed herein are known, information of the type illustrated in FIG. 6 may be presented in a number of different ways without deviating from the scope of the present invention.)

Techniques which have been disclosed may be used advantageously for securing messages in many environments, including dynamic work flow scenarios where a target service provider may be unknown to the message sender and/or may change over the course of a long-running transaction. For example, Acme Widget may desire to allow its supplier's supplier—which, in the above-described example, was Supplier B—to access Acme's confidential information, even though the identity of Supplier B was not configured into Acme's information technology systems. Irrespective of uncertainties of this type, preferred embodiments enable access to sensitive information to be protected, determining the needed protections in a flexible and efficient manner within messages that remain independent of the federation topology.

Optionally, a set of public keys may be established, corresponding to the entities or intermediaries to be encountered on a selected route. An identifier may be assigned to the set, such that a message sender can easily request the key set associated with the route when preparing to encrypt message portions of a message to be transmitted on that route.

As has been demonstrated, the present invention provides advantageous techniques for context-sensitive confidentiality within a federated environment, enabling various receivers of a transmitted message to access aspects of the message without necessarily being able to access the entire message. Preferred embodiments leverage open standards. Note that while particular standards (such as WS-Routing, SOAP, and so forth) have been referenced when describing preferred embodiments, this is for purposes of illustrating the inventive concepts of the present invention: alternative means for providing the analogous functionality may be used without deviating from the scope of the present invention.

The term "service" as used herein includes a composite service, as well as the sub-services which have been aggregated to form that composite service. The term "portlet" is used herein in an illustrative sense and includes component implementations which adhere to component models other than the portlet model which has been illustrated.

Several commonly-assigned and co-pending inventions will now be discussed, and will be distinguished from the teachings of the present invention.

Commonly-assigned and co-pending U.S. Patent Application 20030135628 (Ser. No. 10/047,811; which is titled "Provisioning Aggregated Services in a Distributed Computing Environment", discloses techniques that enable heterogeneous identity systems to be joined in the dynamic, run-time Web services integration environment. This application, referred to herein as "the provisioning invention", is hereby incorporated herein by reference. A provisioning interface was disclosed in the provisioning invention to enable automatically and dynamically federating the heterogeneous identity systems which may be in use among the services which are aggregated as a composite service. Techniques disclosed therein allow users (whether human or programmatic) to be seamlessly authenticated and authorized, or "identified", for using the dynamically-integrated services. According to the provisioning invention, this seamless identification may be provided using a single sign-on, or "unified login", for an aggregated service, wherein the provisioning interface of the aggregated service can be used to solicit all required information from a user at the outset of executing the aggregated service. A "stacking" approach was described whereby user passwords (or other credentials, equivalently, such as tickets or digital certificates) to be provided to the sub-services of an aggregated service are encrypted for securely storing. The sub-services are invoked in a specified order during execution, according to a definition that is preferably specified in the Web Services Flow Language ("WSFL"), and the stacked passwords are then unstacked and presented to the appropriate authentication or authorization sub-service.

The present invention, by contrast, does not use stacking of credentials, and does not rely on a provisioning interface of a Web service. In addition, a user of the present invention is not required to provide credentials beyond those needed for the application or service to which the user is initially authenticated: credentials required for subsequently-accessed services are determined dynamically, using credential mapping, as discussed above.

Commonly-assigned and co-pending U.S. Patent Application 20030163513 (Ser. No. 10/081,300; which is titled "Providing Role-Based Views from Business Web Portals", discloses techniques for federating user profile information. This application, referred to herein as the role-based views application, also discloses techniques for providing this user profile information using a single sign-on approach, whereby identifying information obtained when a user begins to use a portal can be programmatically obtained and used by sub-services of an aggregated service. A federated authentication of an end user is performed (as disclosed in the provisioning invention); security attributes (such as the user's role) which are relevant for authorization are acquired, for this authenticated user; and profile data associated with these security attributes is resolved. Refer to this commonly-assigned application, which is hereby incorporated herein by reference, for more information.

The role-based views application does not teach techniques for context-sensitive confidentiality as disclosed in the present invention.

The provisioning application and the role-based views application assume that each Web service implements its own authentication and authorization operations. As a result, the provisioning application and the role-based views application do not address security domain scenarios where trust, authentication, and/or authorization authorities implement a collective quality of protection spanning distributed services. Enterprise computing environments are expected to deploy applications and services in interconnected and/or disparate domains to achieve desirable scaling, security, and/or other relevant operational characteristics. This model, although not addressed in the provisioning application and the role-based views application, is supported by embodiments of the present invention.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

The invention claimed is:

1. A system for achieving context-sensitive confidentiality among security domains within a federated environment that spans a plurality of security domains, comprising:
    a computer comprising a processor; and
    instructions executable, using the processor, to implement functions of:
        determining a route to be taken by a content request message to be transmitted from a content requester in the federated environment to a content provider in the federated environment, wherein:

the route comprises a network transmission path which begins at the content requester and ends at the content provider and passes through a plurality of intermediary nodes, each of the intermediary nodes located between the content requester and the content provider on the network transmission path;

the route is determined by consulting stored policy that specifies, for the content requester sending the content request message to the content provider, the network transmission path; and the route spans a plurality of the security domains;

storing the determined route at a network-accessible location;

determining, prior to transmitting the content request message from the content requester, a plurality of portions of the content request message that are security-sensitive, further comprising using a context to consult stored policy that identifies the security-sensitive portions which are applicable to said context, wherein the context comprises an identification of the content requester, an identification of the content provider, and a message type identifying the content request message;

determining, prior to transmitting the content request message from the content requester, rights of each of the intermediary nodes to access each of the determined security-sensitive portions of the content request message, further comprising consulting stored policy for each of the intermediary nodes, wherein the stored policy specifies whether said intermediary node is entitled to access said security-sensitive portion of the content request message;

specifying, in unencrypted form in the content request message, the message type; an identifier of the network-accessible location where the determined route is stored; and a plurality of message receiver elements, wherein a separate one of the message receiver elements is specified for each of the intermediary nodes that is entitled to access each of the security-sensitive portions, the separate one specifying an identification of said intermediary node as a permitted receiver of that said security-sensitive portion and a node-specific keyword corresponding to said intermediary node;

selectively protecting the security-sensitive portions of the content request message, according to the determined access rights by encrypting, for each of the security-sensitive portions of the content request message, that security-sensitive portion separately for each distinct one of the intermediary nodes which is entitled to access said security-sensitive portion and storing said separately-encrypted security-sensitive portion in the content request message in association with the node-specific keyword corresponding to the distinct one of the intermediary nodes, thereby enabling each of the intermediary nodes to locate and access each of the security-sensitive portions which the intermediary node is entitled to access and preventing said intermediary node from accessing any of the security-sensitive portions which it is not entitled to access; and transmitting the content request message with said selectively-protected portions from the content requester to the content provider on the determined route, wherein:

the transmitted content request message contains information identifying an authentication authority from a first of the security domains and an identification of a party for which the content request message requests access to services and indicates that the identified authentication authority has already authenticated the party using security credentials of the party in the first security domain;

the intermediary nodes and the content provider, upon receiving the content request message in other ones of the security domains, bypass authentication of the party for access to services of said other security domain, upon verifying authenticity of the authentication authority, establishing that the authentication authority vouches for the received content request message, and using the identification of the party to locate previously-stored security credentials for the party which are usable within the other security domain; and the security credentials for the party in at least one of the other security domains are different from the security credentials of the party in the first security domain.

2. The system according to claim 1, wherein the selectively protecting further comprises computing a digital signature over at least one of the security-sensitive portions of the content request message.

3. The system according to claim 1, wherein the functions further comprise determining a role of at least one of the intermediary nodes, and wherein determining the access rights further comprises using the determined role when consulting the stored policy, wherein the stored policy specifies whether nodes in said role are entitled to access this security-sensitive portion of the content request message.

4. The system according to claim 1, wherein the encrypting uses a public key associated with each of the intermediary nodes for which the encrypting operates.

5. The system according to claim 1, wherein the functions further comprise:

receiving the transmitted content request message at a selected one of the intermediary nodes on the determined route;

using the identifier of the network-accessible location where the determined route is stored, by the selected one, to locate a next hop for forwarding the content request message from the selected one on the determined route;

locating, by the selected one, each of the separate ones of the message receiver elements that specifies the identification of the selected one and retrieving therefrom the specified node-specific keyword; and securely accessing only those ones of the selectively-protected portions of the received content request message to which the selected one has access rights by using each of the retrieved node-specific keywords to locate and access only those ones of the security-sensitive portions which the selected one is entitled to access.

6. The system according to claim 1, wherein the authentication authority is determined to vouch for the received content request message if a digital signature computed by the authentication authority and transmitted with the content request message is determined, by the intermediary node or the content provider, upon receiving the content request message in the one of the other security domains, to be valid.

7. The system according to claim 1, wherein the transmitted content request message contains security credentials of the party, where the security credentials have been authenticated by the identified authentication authority and are protected such that only authorized ones of the intermediary nodes and the content provider, upon receiving the content request message in other ones of the security domains, can access the protected security credentials.

8. A computer program product for achieving context-sensitive confidentiality among security domains within a federated environment that spans a plurality of security domains, the computer program product embodied on one or more computer-readable storage media and comprising computer-executable program instructions for:
   determining a route to be taken by a content request message to be transmitted from a content requester in the federated environment to a content provider in the federated environment, wherein:
      the route comprises a network transmission path which begins at the content requester and ends at the content provider and passes through a plurality of intermediary nodes, each of the intermediary nodes located between the content requester and the content provider on the network transmission path;
      the route is determined by consulting stored policy that specifies, for the content requester sending the content request message to the content provider, the network transmission path; and
      the route spans a plurality of the security domains;
   storing the determined route at a network-accessible location;
   determining, prior to transmitting the content request message from the content requester, a plurality of portions of the content request message that are security-sensitive, further comprising using a context to consult stored policy that identifies the security-sensitive portions which are applicable to said context, wherein the context comprises an identification of the content requester, an identification of the content provider, and a message type identifying the content request message;
   determining, prior to transmitting the content request message from the content requester, rights of each of the intermediary nodes to access each of the determined security-sensitive portions of the content request message, further comprising consulting stored policy for each of said intermediary nodes, wherein the stored policy specifies whether this intermediary node is entitled to access said security-sensitive portion of the content request message;
   specifying, in unencrypted form in the content request message, the message type; an identifier of the network-accessible location where the determined route is stored; and a plurality of message receiver elements, wherein a separate one of the message receiver elements is specified for each of the intermediary nodes that is entitled to access each of the security-sensitive portions, the separate one specifying an identification of said intermediary node as a permitted receiver of said security-sensitive portion and a node-specific keyword corresponding to said intermediary node;
   selectively protecting the security-sensitive portions of the content request message, according to the determined access rights by encrypting, for each of the security-sensitive portions of the content request message, that security-sensitive portion separately for each distinct one of the intermediary nodes which is entitled to access said security-sensitive portion and storing said separately-encrypted security-sensitive portion in the content request message in association with the node-specific keyword corresponding to the distinct one of the intermediary nodes, thereby enabling each of the intermediary nodes to locate and access each of the security-sensitive portions which the intermediary node is entitled to access and preventing said intermediary node from accessing any of the security-sensitive portions which it is not entitled to access; and
   transmitting the content request message with said selectively-protected portions from the content requester to the content provider on the determined route, wherein:
      the transmitted content request message contains information identifying an authentication authority from a first of the security domains and an identification of a party for which the content request message requests access to services and indicates that the identified authentication authority has already authenticated the party using security credentials of the party in the first security domain;
      the intermediary nodes and the content provider, upon receiving the content request message in other ones of the security domains, bypass authentication of the party for access to services of said other security domain, upon verifying authenticity of the authentication authority, establishing that the authentication authority vouches for the received content request message, and using the identification of the party to locate previously-stored security credentials for the party which are usable within the other security domain; and
      the security credentials for the party in at least one of the other security domains are different from the security credentials of the party in the first security domain.

9. The computer program product according to claim 8, wherein the selectively protecting further comprises computing a digital signature over at least one of the security-sensitive portions of the content request message.

10. The computer program product according to claim 8, further comprising determining a role of at least one of the intermediary nodes, and wherein determining the access rights further comprises using the determined role when consulting the stored policy, wherein the stored policy specifies whether nodes in said role are entitled to access this security-sensitive portion of the content request message.

11. The computer program product according to claim 8, wherein the encrypting uses a public key associated with each of the intermediary nodes for which the encrypting operates.

12. The computer program product according to claim 8, further comprising computer-executable program instructions for:
   receiving the transmitted content request message at a selected one of the intermediary nodes on the determined route;
   using the identifier of the network-accessible location where the determined route is stored, by the selected one, to locate a next hop for forwarding the content request message from the selected one on the determined route;
   locating, by the selected one, each of the separate ones of the message receiver elements that specifies the identification of the selected one and retrieving therefrom the specified node-specific keyword; and
   securely accessing only those ones of the selectively-protected portions of the received content request message to which the selected one has access rights by using each of the retrieved node-specific keywords to locate and access only those ones of the security-sensitive portions which the selected one is entitled to access.

13. The computer program product according to claim 8, wherein the authentication authority is determined to vouch for the received content request message if a digital signature computed by the authentication authority and transmitted with the content request message is determined, by the intermediary node or the content provider, upon receiving the content request message in the one of the other security domains, to be valid.

14. The computer program product according to claim 8, wherein the transmitted content request message contains security credentials of the party, where the security credentials have been authenticated by the identified authentication authority and are protected such that only authorized ones of the intermediary nodes and the content provider, upon receiving the content request message in other ones of the security domains, can access the protected security credentials.

* * * * *